(12) United States Patent
Cotterill

(10) Patent No.: US 9,002,322 B2
(45) Date of Patent: Apr. 7, 2015

(54) AUTHENTICATION WITH SECONDARY APPROVER

(75) Inventor: Stephen Hayden Cotterill, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 704 days.

(21) Appl. No.: 13/248,872

(22) Filed: Sep. 29, 2011

(65) Prior Publication Data

US 2013/0082819 A1  Apr. 4, 2013

(51) Int. Cl.
| | |
|---|---|
| G08B 29/00 | (2006.01) |
| G06F 21/35 | (2013.01) |
| G06F 21/36 | (2013.01) |
| G06F 21/40 | (2013.01) |

(52) U.S. Cl.
CPC ............. *G06F 21/35* (2013.01); *G06F 21/36* (2013.01); *G06F 21/40* (2013.01)

(58) Field of Classification Search
USPC .................................. 455/406, 410, 411, 415
See application file for complete search history.

(56) References Cited

U.S. PATENT DOCUMENTS

| | | | |
|---|---|---|---|
| 7,415,720 | B2 | 8/2008 | Jung |
| 7,877,455 | B2 | 1/2011 | Lamparello et al. |
| 8,042,157 | B2 | 10/2011 | Bennett et al. |
| 2002/0059295 | A1 | 5/2002 | Ludtke et al. |
| 2002/0169673 | A1 | 11/2002 | Prorock et al. |
| 2002/0170782 | A1 | 11/2002 | Millikan |
| 2004/0181695 | A1 | 9/2004 | Walker |
| 2007/0186106 | A1 | 8/2007 | Ting et al. |
| 2008/0114678 | A1 | 5/2008 | Bennett et al. |
| 2008/0229409 | A1 | 9/2008 | Miller et al. |
| 2009/0054044 | A1 | 2/2009 | Ikemori et al. |
| 2009/0094681 | A1 | 4/2009 | Sadler et al. |
| 2009/0119754 | A1 | 5/2009 | Schubert |
| 2009/0122149 | A1 | 5/2009 | Ishii |
| 2009/0193514 | A1 | 7/2009 | Adams et al. |
| 2009/0241169 | A1 | 9/2009 | Dhand et al. |
| 2011/0054268 | A1 | 3/2011 | Fidacaro et al. |
| 2011/0138166 | A1 | 6/2011 | Peszek et al. |
| 2011/0142234 | A1 | 6/2011 | Rogers |
| 2011/0149874 | A1 | 6/2011 | Reif |

OTHER PUBLICATIONS

PCT International Search Report and Written Opinion of the International Search Authority for International Application No. PCT/US2012/057319, Date of Mailing Feb. 25, 2013, (9 pages).

(Continued)

*Primary Examiner* — Sam Bhattacharya
(74) *Attorney, Agent, or Firm* — Blakely, Sokoloff, Taylor & Zafman LLP

(57) ABSTRACT

Techniques are provided for giving access to restricted content on a first device from a second device through a wireless network. In one embodiment, the first device transmits an authorization request signal to the second device or to a server in the wireless network. The second device, having received the authorization request, prompts an authorized user to give authorization to the first device by inputting an authentication key such as a password or gesture on the second device. Upon verification of the authentication key, an authorization signal may be wirelessly transmitted to the first device, permitting access to the restricted content or functions on the first device. In some embodiments, the second device may be alerted to an authorization request and may select a request for authorization from a selectable queue of requests.

35 Claims, 8 Drawing Sheets

(56) References Cited

OTHER PUBLICATIONS

PCT International Search Report and Written Opinion of the International Searching Authority for International Application No. PCT/US2012/057656, mailed Feb. 25, 2013, (9 pages).

PCT International Preliminary Report on Patentability for International Application No. PCT/S2012/057656, mailing date Apr. 10, 2014, 6 pages.

International Preliminary Report on Patentability for corresponding International Application No. PCT/US2012/057319, mailing date Apr. 10, 2014, 6 pages.

AUTHENTICATION WITH SECONDARY APPROVER

BACKGROUND

The present disclosure relates generally to electronic devices, and more specifically to authentication of an electronic device.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic devices, such as cellular telephones, computers, tablets, and so forth, are commonly used in many industries, and in a wide range of applications. Such electronic devices may contain various information and functions, some of which may be confidential or restricted. Securing restricted content on an electronic device may involve a configuration in which nonrestricted content may be generally accessible while restricted content is generally inaccessible without authorization and/or authentication. To access such restricted content, a user may be authenticated for accessing restricted content when an electronic device or system verifies the user's identity (e.g., by entering a correct login key or passcode), or a user may be authorized to access restricted content when the device or system determines that the user has an appropriate access level for accessing or performing the restricted content.

Conventionally, to access restricted content on an electronic device requiring a login key, a user with knowledge of the login key may input the login key in an user interface of the electronic device, which generally requires the authorized user to physically interact with the device. Furthermore, a user who is not privileged with knowledge of the login key may sometimes need to access restricted content on a device, and may typically need further authorization before proceeding to access the restricted content. For example, a retail system may include several electronic devices, each including information or functions which have access restrictions based on the access levels of the employees using the devices. An employee may sometimes need to access restricted content that the employee does not have access to, and in such instances, manager authorization may be required before the restricted content may be accessed by the employee. However, the process of authorizing an employee's access on the employee's device may be inefficient.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the present disclosure relate to systems and methods for obtaining secondary authorization wirelessly. For example, a first device may contain restricted content that cannot be access without authorization from a second device. The present techniques allow the first device to send an authorization request signal to the second device, and allow the second device to give or deny authorization to the first device by sending an authorization signal.

In some embodiments, the first device may be a retail transaction or information device used by an employee, and the second device may be a similar or different device used by a manager. Thus, the employee may obtain access to restricted content their device wirelessly from the manager's device, so long as the manager give the employee access from the manager's device Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present techniques involve a secondary authorization techniques where a requesting device (also referred to as a first device) in a system may wirelessly request and receive authorization to access restricted content on the first device from an authorizing device (also referred to as a second device) in the system. Embodiments of the present techniques may be applied in a retail system involving a network of electronic devices each having various functions, where the various functions may have one or more access levels. For example, certain functions (e.g., accepting payment, accessing purchase history, etc.) may have a first access level and may be generally unrestricted to a user of the retail system (e.g., an employee) having the first access level. However, other functions (e.g., accepting merchandise return, giving a discount, or overriding a warranty, etc.) may have a second access level and may be restricted without authorization from a user (e.g., from a manager) having the second access level.

Conventionally, a manager may input an authorization key or login on the same device used by the employee before the employee may perform a restricted function. In accordance with embodiments of the present techniques, an employee using a first device may wirelessly request and receive approval from a manager using a second device to perform otherwise restricted functions on the first device.

In some embodiments, an authorizing device may be able to give authorization to multiple requesting devices. Relating to the retail application previously mentioned, a manager may use one authorizing device to give authorization to multiple requesting devices from which employees may access restricted content. As may be common in retail settings, each employee may be using a different first device located in different places throughout a retail setting. In some embodiments, the manager may not need to travel to the location of each employee requiring access to restricted content. Rather, the manager may provide authorization to each employee's devices wirelessly and without physically traveling to each employee's respective location.

Figure 1:
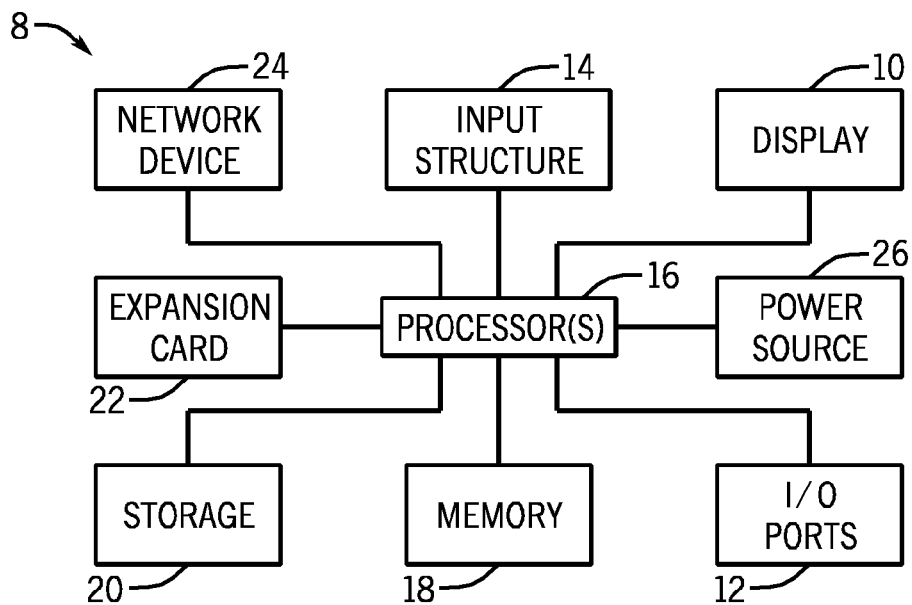
FIG. 1 is a block diagram of components of an electronic device, in accordance with aspects of the present disclosure.
Figure 3:
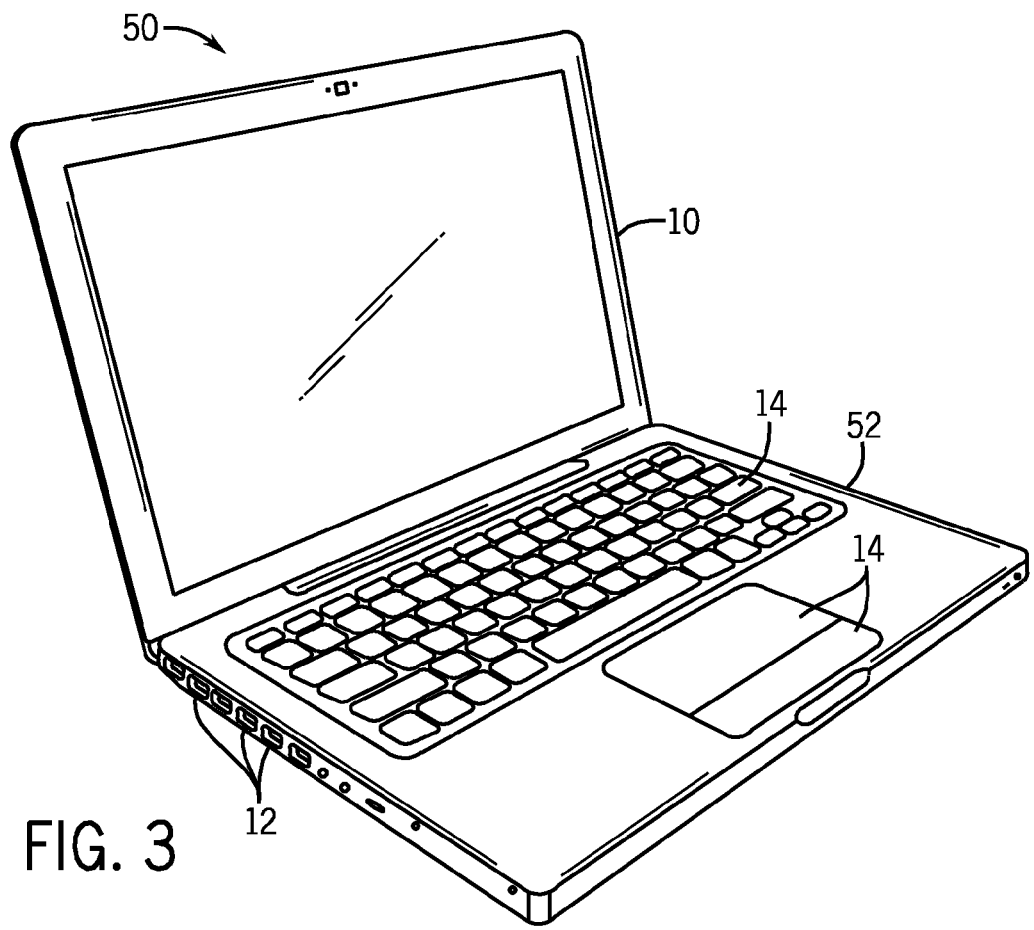
FIG. 3 is a view of a computer for use in accordance with aspects of the present disclosure.
Figure 2:
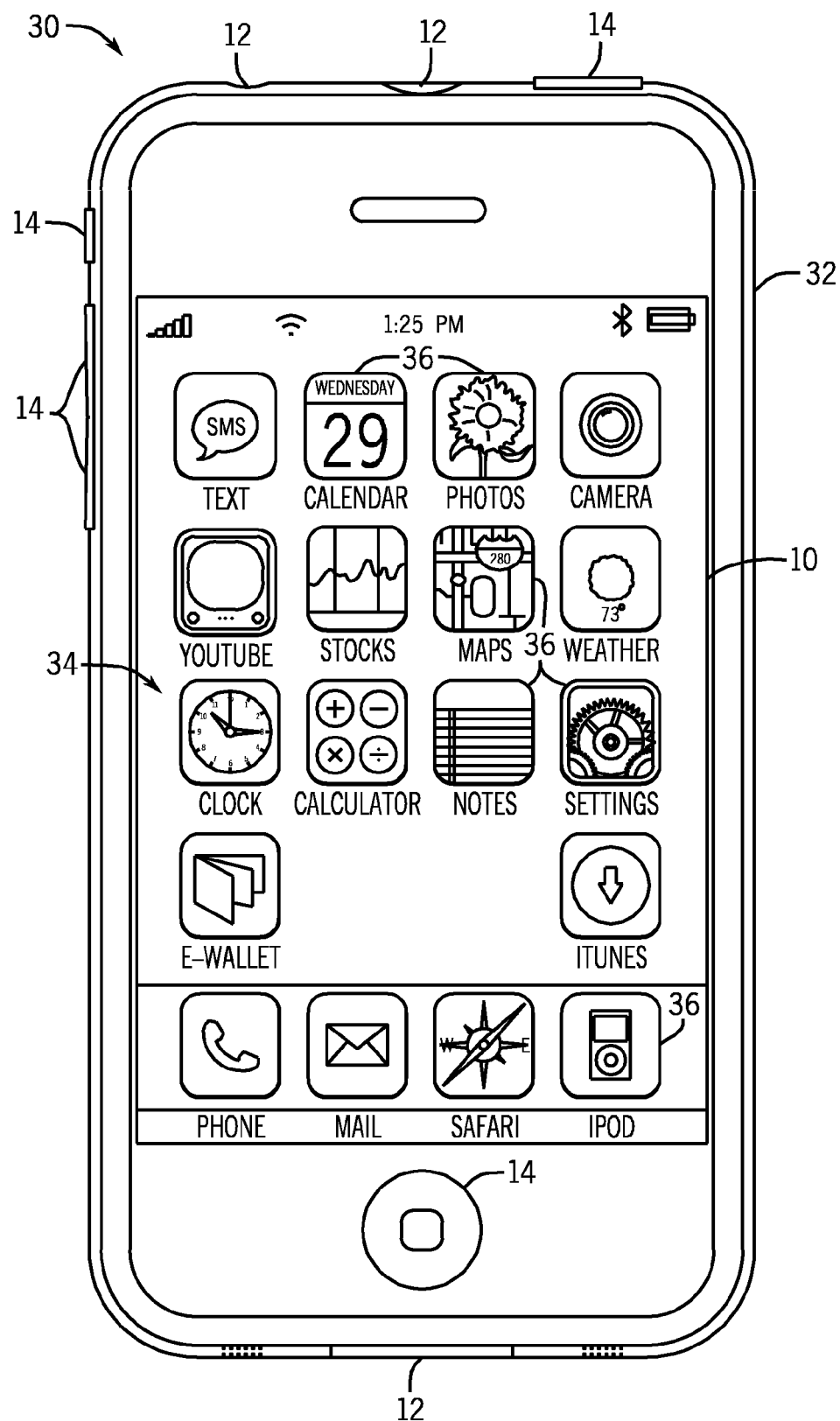
FIG. 2 is a front view of a handheld electronic device in accordance with aspects of the present disclosure.

With these foregoing features in mind, a general description of suitable electronic devices for implementing aspects of the present techniques is provided. In FIG. 1, a block diagram depicting various components that may be present in electronic devices suitable for use with the present techniques is provided. In FIG. 2, one example of a suitable electronic device, here provided as a handheld electronic device, is depicted. In FIG. 3, another example of a suitable electronic device, here provided as a computer system, is depicted. Such electronic devices, as well as other electronic devices providing suitable storage and/or processing capabilities, may be used in conjunction with the present techniques. Furthermore, suitable electronic devices may have wireless communication capabilities and may be able to wirelessly communicate with other electronic devices to perform the secondary authorization techniques of the present disclosure.

An example of a suitable electronic device may include various internal and/or external components which contribute to the function of the device. FIG. 1 is a block diagram illustrating the components that may be present in such an electronic device 8 and which may allow the device 8 to function in accordance with the techniques discussed herein. As will be appreciated, the various functional blocks shown in FIG. 1 may include hardware elements (including application specific or generic circuitry), software elements (including computer code stored on a machine-readable medium) or a combination of both hardware and software elements. It should further be noted that FIG. 1 is merely one example of a particular implementation and is merely intended to illustrate the types of components that may be present in a device 8. For example, in the presently illustrated embodiment, these components may include a display 10, I/O ports 12, input structures 14, data processing circuitry, such as one or more processors 16, a memory device 18, a non-volatile storage 20, expansion card(s) 22, a networking device 24, and a power source 26.

With regard to each of these components, the display 10 may be used to display various images generated by the device 8. The display 10 may be any type of display such as a cathode ray tube (CRT), a liquid crystal display (LCD), a light emitting diode (LED) display, an organic light emitting diode (OLED) display, or other suitable display. In certain embodiments of the electronic device 8, the display 10 may include a touch-sensitive element, such as a touch screen.

The I/O ports 12 may include ports configured to connect to a variety of external devices, such as a power source or other electronic devices (such as handheld devices and/or computers, printers, projectors, external displays, modems, docking stations, and so forth). For example, in some embodiments, peripheral hardware attachments such as a credit card reader, commonly referred to as a card sled, may be connected to the device 8 through I/O ports 12. In some embodiments, information obtained through the credit card reader may be transmitted to a suitable processor (e.g., processor 16). The I/O ports 12 may support any standard or proprietary interface type, such as a universal serial bus (USB) port, a video port, a serial connection port, an IEEE-1394 port, an Ethernet or modem port, and/or an AC/DC power connection port.

The input structures 14 may include the various devices, circuitry, and pathways by which input or feedback is provided to data processing circuitry, such as the processor 16. Such input structures 14 may be configured to control a function of the device 8 when actuated. For example, the input structures 14 may include buttons, sliders, switches, control pads, keys, knobs, scroll wheels, keyboards, mice, touchpads, and so forth. In certain embodiments, the input structures 14 may also include such components as global positioning system (GPS) circuitry and/or accelerometers that convey information about the location and/or orientation of the device 8 to the processors 16.

In certain embodiments, an input structure 14 and display 10 may be provided together, such an in the case of a touch screen where a touch sensitive mechanism is provided in conjunction with the display 10. In such embodiments, the user may select or interact with displayed interface elements via the touch sensitive mechanism. In this way, the displayed user interface may provide interactive functionality, allowing a user to select, by touch screen or other input structure, from among options displayed on the display 10.

User interaction with the input structures 14, such as to interact with a user or application interface displayed on the display 10, may generate electrical signals indicative of the user input. These input signals may be routed via suitable pathways, such as an input hub or bus, to data processing circuitry, such as the processor(s) 16, for further processing.

The processor(s) 16 may provide data processing capability to execute the operating system, programs, user and application interfaces, and any other functions of the electronic device 8. The processor(s) 16 may include one or more microprocessors, such as one or more "general-purpose" microprocessors, one or more special-purpose microprocessors and/or ASICS, or some combination of such processing components. For example, the processor 16 may include one or more reduced instruction set (RISC) processors, as well as graphics processors, video processors, audio processors and/or related chip sets.

The instructions or data to be processed by the processor(s) 16 may be stored in a memory 18. The memory 18 may be provided as a volatile memory, such as random access memory (RAM), and/or as a non-volatile memory, such as read-only memory (ROM). The memory 18 may store a variety of information and may be used for various purposes. For example, the memory 18 may store firmware executed by a processor 16 (such as basic input/output instructions or operating system instructions, including instructions implementing non-alphanumeric authentication (e.g., authentication not based on keys or characters found on a keyboard) as discussed herein), other programs that enable various functions of the electronic device 8, user interface functions, processor functions. In addition, the memory 18 may be used for buffering or caching during operation of the electronic device 8.

The components may further include a non-volatile storage 20 for persistent storage of data and/or instructions. The non-volatile storage 20 may include flash memory, a hard drive, or any other optical, magnetic, and/or solid-state storage media. The non-volatile storage 20 may be used to store data files such as personal or business information (e.g., financial and other account information), software, wireless connection information (e.g., information that may enable the electronic device 8 to establish a wireless connection, such as a telephone or wireless network connection), and any other suitable data. In addition, the non-volatile storage 20 may also store code and/or data for implementing various functions of the electronic device 8, such as application or program code, data associated with such applications or programs, operating system code, user configured preferences, as well as code for implementing secure user authentication as discussed herein.

The embodiment illustrated in FIG. 1 may also include one or more card or expansion slots. The card slots may be configured to receive an expansion card 22 that may be used to add functionality, such as additional memory, I/O functionality, or networking capability, to the electronic device 8. Such an expansion card 22 may connect to the device through any type of suitable standard or proprietary connector, and may be accessed internally or external to the housing of the electronic device 8. For example, in one embodiment, the expansion card 22 may be flash memory card, such as a SecureDigital (SD) card, mini- or microSD, CompactFlash card, Multimedia card (MMC), or the like.

The components depicted in FIG. 1 also include a network device 24, such as a network controller or a network interface card (NIC). In one embodiment, the network device 24 may be a wireless NIC providing wireless connectivity over any 802.11 standard or any other suitable wireless networking standard. The network device 24 may allow the electronic device 8 to communicate over a network, such as a Local Area Network (LAN), Wide Area Network (WAN), cellular network, or the Internet. Further, the electronic device 8 may connect to and send or receive data with any device on the network, such as portable electronic devices, personal computers, printers, and so forth. Alternatively, in some embodiments, the electronic device 8 may not include a network device 24. In such an embodiment, a NIC may be added as an expansion card 22 to provide similar networking capability as described above.

Further, the components may also include a power source 26. In one embodiment, the power source 26 may be one or more batteries, such as a lithium-ion polymer battery. The battery may be user-removable or may be secured within the housing of the electronic device 8, and may be rechargeable. Additionally, the power source 26 may include AC power, such as provided by an electrical outlet, and the electronic device 8 may be connected to the power source 26 via a power adapter. This power adapter may also be used to recharge one or more batteries if present.

With the foregoing in mind, FIG. 2 illustrates an electronic device 8 in the form of a handheld device 30, here a cellular telephone, which may be used as a first device and/or a second device. It should be noted that while the depicted handheld device 30 is provided in the context of a cellular telephone, other types of handheld devices (such as media players for playing music and/or video, personal data organizers, handheld game platforms, and/or combinations of such devices) may also be suitable be provided as the electronic device 8. Further, a suitable handheld device 30 may incorporate the functionality of one or more types of devices, such as a media player, a cellular phone, a gaming platform, a personal data organizer, and so forth.

For example, in the depicted embodiment, the handheld device 30 is in the form of a cellular telephone that may provide various additional functionalities (such as the ability to take pictures, record audio and/or video, listen to music, play games, and so forth). As discussed with respect to the generalized electronic device of FIG. 1, the handheld device 30 may allow a user to connect to and communicate through the Internet or through other networks, such as local or wide area networks or cellular networks. For example, the handheld device 30 may allow a user to communicate using e-mail, text messaging, instant messaging, or other forms of electronic communication. The handheld electronic device 30, may also communicate with other devices using short-range connections, such as Bluetooth and near field communication. By way of example, the handheld device 30 may be a model of an iPod® or iPhone®, or a derivative thereof, available from Apple Inc. of Cupertino, Calif. The handheld electronic device 30 may also be in the form of a tablet computer. By way of example, the tablet computer may be a model of an iPad®, or a derivative thereof, available from Apple Inc. of Cupertino, Calif.

In the depicted embodiment, a housing 32 includes input structures 14 through which a user may interface with the device. Each input structure 14 may be configured to help control a device function when actuated. For example, in a cellular telephone implementation, one or more of the input structures 14 may be configured to invoke a "home" screen or menu to be displayed, to toggle between a sleep and a wake mode, to silence a ringer for a cell phone application, to increase or decrease a volume output, and so forth.

A display 10 of the handheld device 30 may be used to display a graphical user interface (GUI) 34 that allows a user to interact with the handheld device 30. The GUI 34 may include various layers, windows, screens, templates, or other graphical elements that may be displayed in all, or a portion, of the display 10. Generally, the GUI 34 may include graphical elements that represent applications and functions of the electronic device. The graphical elements may include icons 36 and other images representing buttons, sliders, menu bars, and the like. The icons 36 may correspond to various applications of the electronic device that may open upon selection of a respective icon 36. Furthermore, selection of an icon 36 may lead to a hierarchical navigation process, such that selection of an icon 36 leads to a screen that includes one or more additional icons or other GUI elements. The icons 36 may be selected via a touch screen provided as the display 10 in certain embodiments, or may be selected by a user input structure 14, such as a wheel or button.

In addition to handheld devices 30, such as the depicted cellular telephone of FIG. 2, an electronic device 8 may also take the form of a computer or other types of electronic device on which confidential information might be stored and on which software code governing secure access to such information might be executed. Such computers may include computers that are generally portable (such as laptop, notebook, and tablet computers) as well as computers that are generally used in one place (such as conventional desktop computers, workstations and/or servers). In certain embodiments, the electronic device 8 in the form of computer may be a model of a MacBook®, MacBook® Pro, MacBook Air®, iMac®, Mac® mini, or Mac Pro® available from Apple Inc.

By way of example, an electronic device 8 in the form of a laptop computer 50 is illustrated in FIG. 3 in accordance with one embodiment. The depicted computer 50 includes a housing 52, a display 10, input structures 14, and input/output ports 12. The input structures 14 (such as a keyboard and/or a touchpad) may be used to interact with the computer 50, such as to start, control, or operate a GUI or applications running on the computer 50. For example, a keyboard and/or touchpad may allow a user to navigate a user interface or application interface displayed on the display 10. In addition, the input and output ports 12 may allow connection of additional devices. For example, the computer 50 may include an I/O port 12, such as a USB port or other port, suitable for connecting to another electronic device, such as a handheld electronic device 30.

In addition, as discussed with respect to the handheld device 30, the computer 50 may include data processing circuitry (such as one or more processors), network connectivity, memory, and storage capabilities that allow the computer 50 to store and execute a GUI and other applications suitable for implementing the present techniques. For example, the computer 50 may be capable of storing and executing programming code encoding routines suitable for accessing confidential information or secured applications or network connections using non-alphanumeric and non-biometric inputs (e.g., gestures, sequences, and so forth). Further, to the extent that a computer 50 has network connectivity, such connectivity may be utilized to update or modify an existing application on the computer 50 to provide such functionality.

Figure 4:
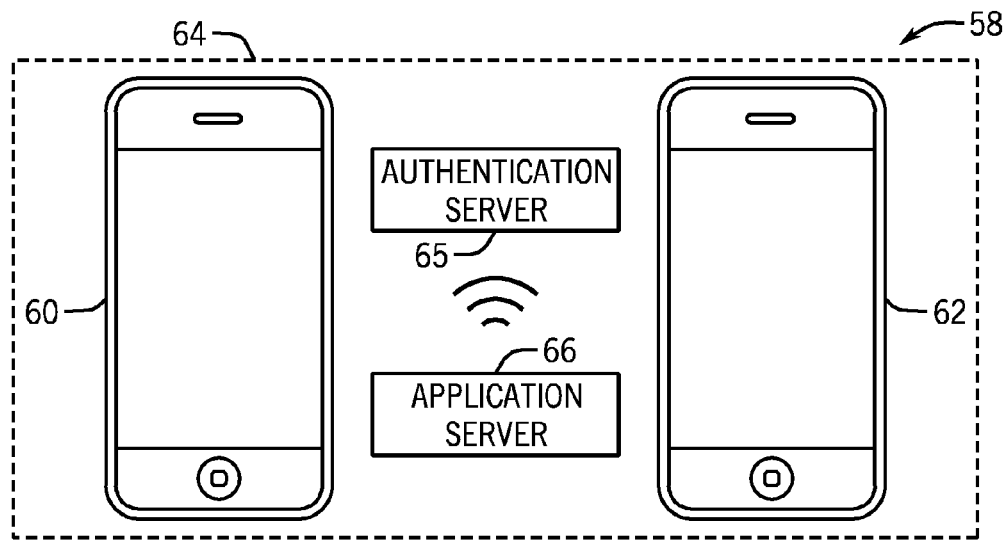
FIG. 4 is a representation of a secondary authorization system, in accordance with the present disclosure.

With the foregoing discussion in mind, it may be appreciated that the electronic device 8 may be suitable for the secondary authorization techniques presented in this disclosure. FIG. 4 illustrates a secondary authorization system 58, which includes a first device 60, a second device 62, a wireless network 64, an authentication server 65, and an application server 66. In some embodiments, the first device 60 and/or the second device may be a handheld device 30 (FIG. 2), a laptop computer 60 (FIG. 3), or any other suitable electronic device 8.

The first device 60 may include various content and functionality, some of which may have different access restrictions. The first device 60 may be used by a user with limited authority, henceforth known as a limited authority user. The first device 60 generally includes common content, which may include information or functions that are accessible by the limited authority user without further authorization. In some embodiments, the first device 60 may request an initial login by the limited authority user before the common content may be accessed. For example, the first device 60 may be configured to be able to perform tasks such as completing a purchase transaction without additional authorization, as a purchase transaction may be an example of common content. However, the first device 60 may not be able to perform a merchandise return transaction (i.e., transferring money onto a credit card), as a return transaction may be an example of restricted content. In some embodiments, the first device 60 may transmit a secondary authorization request signal to the second device 62 via a wireless network 64 to request authorization.

The second device 62 may generally be used by a user having a higher level of authority, henceforth known as full authority user, and may have the authority to access restricted content, as well as give authorization to a limited authority user to access the restricted content. The second device 62 may receive the secondary authorization request, and a full authority user operating the second device 62 may select to authorize the restricted content corresponding to the received secondary authorization request. To indicate authorization to the first device 60, the second device 62 may transmit an authorization signal to the first device 60, and the restricted content may then be accessible from the first device 60.

The first device 60 and the second device 62 may communicate with each other and other devices via the wireless network 64. The wireless network 64 may be a personal area network (PAN) such as a Bluetooth™ network, a local area network (LAN) such as an 802.11 Wi-Fi network, a wide area network (WAN) such as a 3G or 4G cellular network, and other suitable wireless networks.

The authentication server 65 in the wireless network 64 may include account data and/or identity data associated with accounts associated with the secondary authorization system 58. For example, account information for each employee of the system 58 may be stored in the authentication server 65. In some embodiments, the authentication server 65 may include processing or control elements suitable for verifying a user's account, referred to as authenticating a user. For example, the authentication server 65 may compare a user authentication input (e.g., an identifying password, gesture, account name, etc.) with account data stored in an account database in the authentication server 65.

In some embodiments, the secondary authorization system 58 may also include an application server 66 connected in the wireless network 64. The application server 66 may be configured to proxy between the first device 60 and the second device 62. The application server 66 may verify any authentication inputs by accessing the authentication server 65. If authentication is verified at the authentication server 65, the application server may be configured to transmit an authorization signal to the first device 60, and the restricted content may then be accessible from the first device 60. In some embodiments, the application server 66 may also verify an authority level of an authenticated user for performing a function, accessing content, or authorizing access to content or functions. In some embodiments, processing components or data associated with authentication and authorization may be stored in the second device 62.

Figure 5:
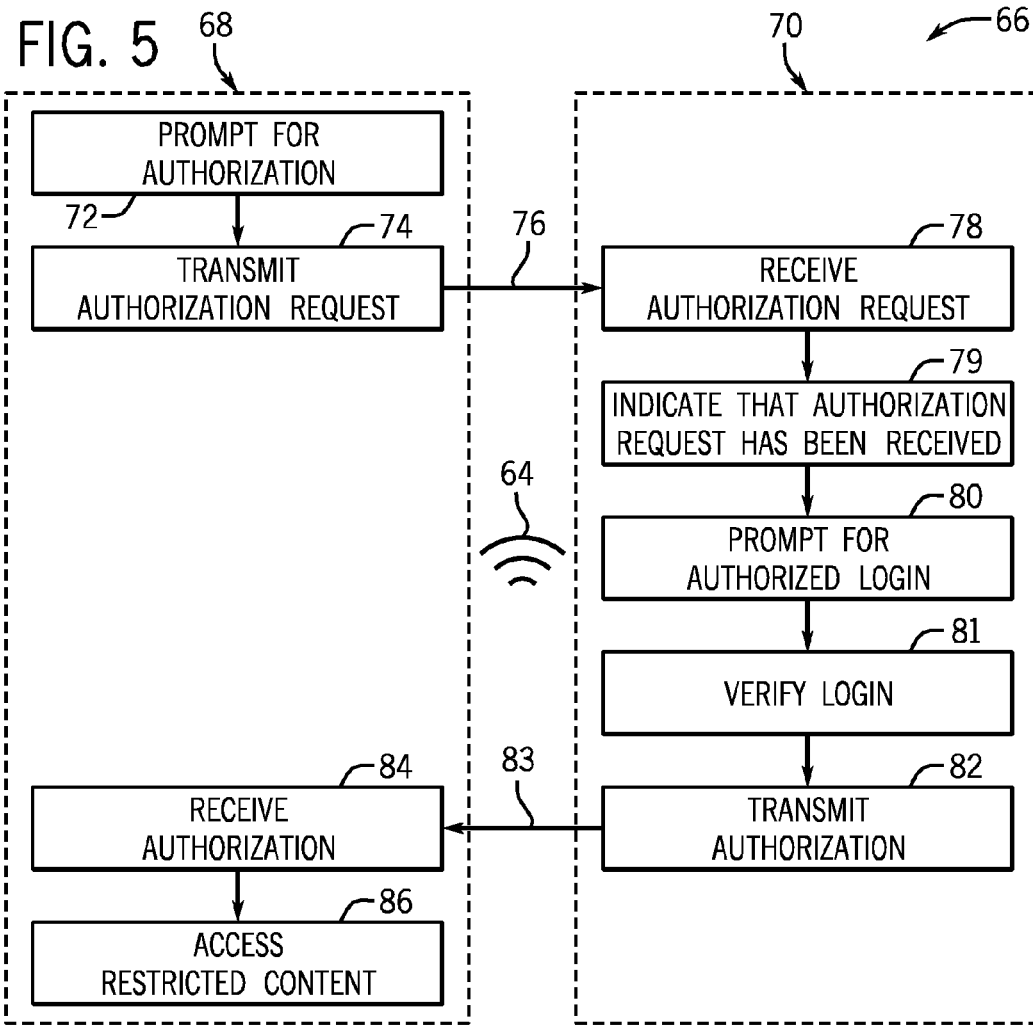
FIG. 5 is a flowchart depicting a process of authorizing content on a first device from a second device, in accordance with the present disclosure.

FIG. 5 is a flowchart representing a secondary authorization process 66. FIGS. 6-10 are a series of exemplary screenshots which illustrate the first and second devices at various points in the secondary authorization process 66. As FIGS. 6-10 represent screens displayed during the process illustrated in FIGS. 5 and 6-10 will be discussed concurrently.

Figure 6:
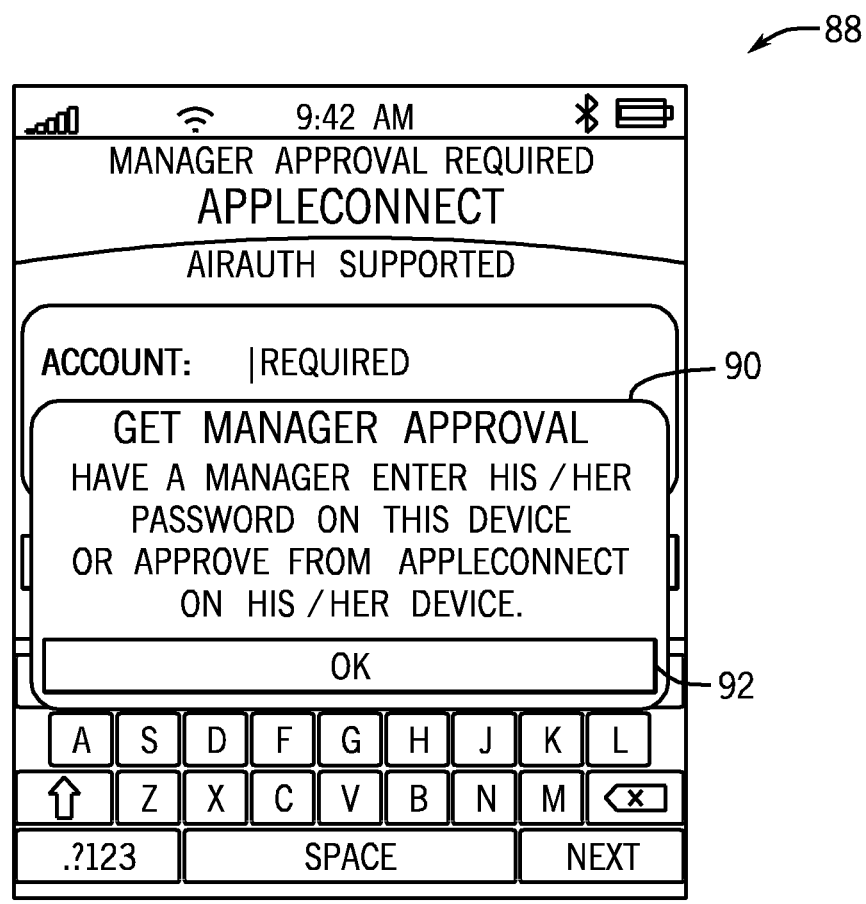
FIG. 6 is a screen of an electronic device indicating that authorization is required to access content on the device, in accordance with the present disclosure.

As illustrated in FIG. 5, the secondary authorization process 66 is categorized into first device actions 68 and second device actions 70. The process 66 of obtaining secondary authorization is initiated when the first device 60 prompts (block 72) for authorization. FIG. 6 is an illustration of a screen on the first device 60 when the first device 60 prompts for authorization. An authorization prompt 90 may be displayed on the screen 88. In some embodiments, the authorization prompt 90 may include an accept button 92. Activating the accept button 92 may indicate that the limited authority user is aware that authorization is required to proceed with accessing the desired restricted content. In some embodiments, activating the accept button 92 the first device 60 may initiate a request for authorization, and in other devices, the first device 60 may display an additional screen for confirming the transmission of an authorization request signal. In different embodiments, "activating" a button may be done by a number of actions, such as pressing, pushing, selecting, touching, and so forth, depending on the configuration of the devices 60 and 62.

In some embodiments, upon initiation of an authorization request (e.g., in response to activation of the accept button 92), the first device 60 may display an input screen 94 (FIG. 7A), in which entry of a correct input on the first device 60 may authorize the restricted content on the first device 60. For example, a full authority user may enter an input directly on the first device 60 to give authorization to the restricted content from the first device 60. In some embodiments, the first device 60 may request an authorizing input directly into the first device 60 when secondary authorization techniques are not available. For instance, the first device 60 may display an input screen 94 if a suitable wireless connection 64 between the first device 60 and the second device 62 is not detected.

Figure 7A:
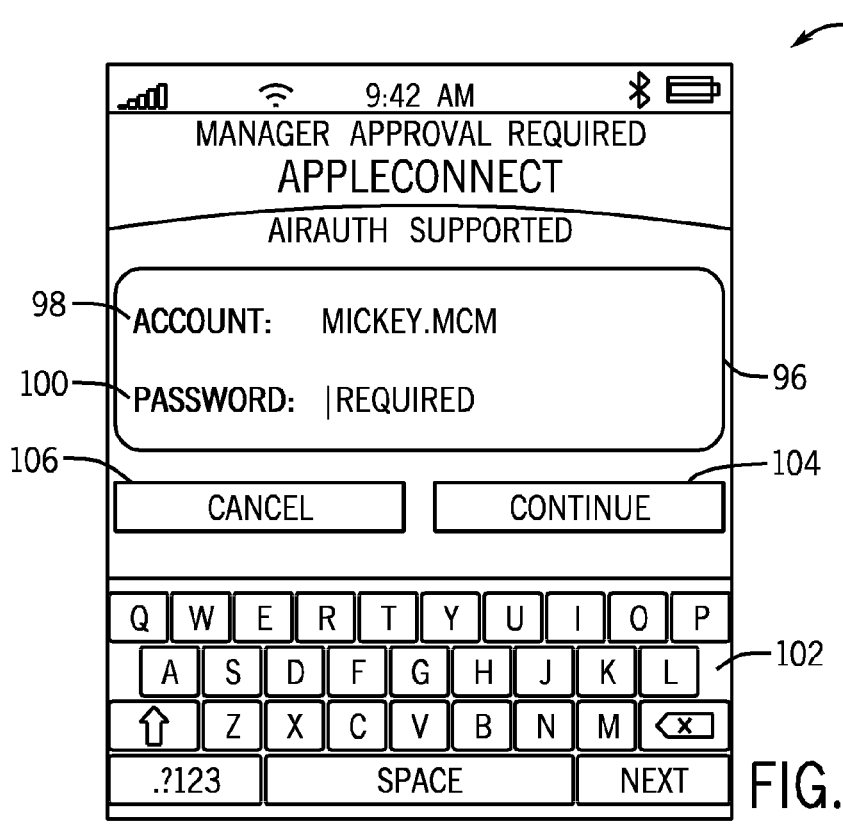
FIG. 7 is a screen of the electronic device in FIG. 6 indicating that a request for authorization has been transmitted to another device in the secondary authorization system, in accordance with the present disclosure.
Figure 7B:
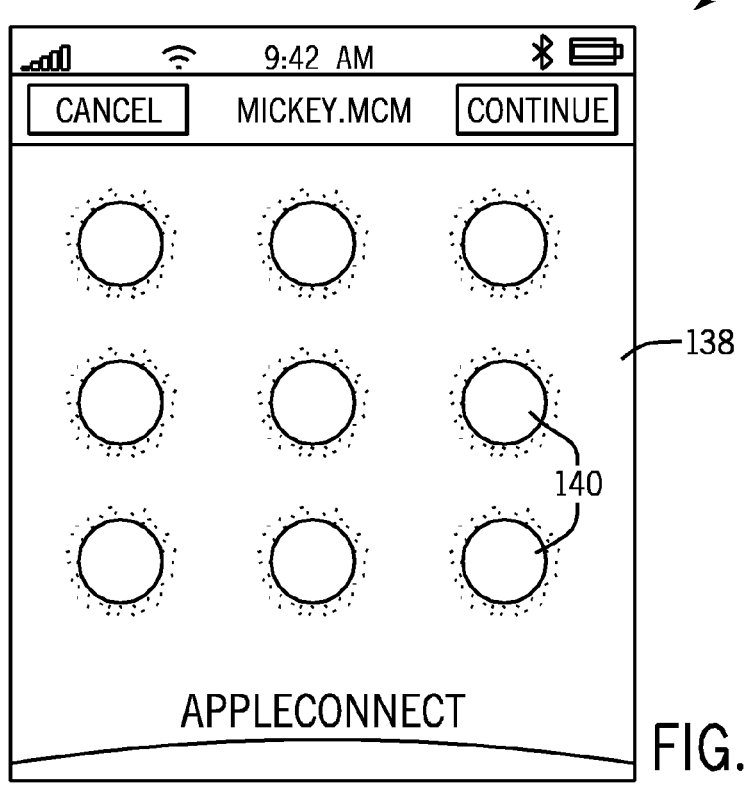

In some embodiments, a prompt 96 on the input screen 94 includes an account data field 98 and a password data field 100. Information generally related to the identity of the user may be entered into the account data field 98, and information generally related to a secure password may be entered into the password data field 100. In some embodiments, a user may use a keypad 102 to enter information in the account data field 98 and password data field 100. After the login information is entered, a continue button 104 may be selected, and the first device 60 may verify the entered information. A cancel button 106 may also be displayed, and selection of this button 106 may cancel the authorization request and return the first device 60 to a previous page. Correct entries in the account data field 98 and in the password data field 100 may result in the authentication of a user having full authorization (and authority to authorize others) on the first device 60, thereby authorizing access to the restricted content which initiated the authorization request Additionally, as illustrated in FIG. 7B, one or more embodiments include authenticating a full authority user on the first device 60 through a gesture login screen 136 on the first device. The gesture login 136 includes a gesture node arrangement 138 including multiple gesture nodes 140. The identity of the user may be verified when the user touches or swipes across the gesture nodes 140 in a predetermined fashion. The correct pattern or path in which the gesture nodes 140 are selected is a cryptographic key corresponding to an authorized user, such that correctly touching the gesture map 138 allows the first device 60 to verify the identity and authorization level of the user. In some embodiments, a user may select between either the input screen 94 or the gesture login screen 136 for authentication on the first device 60.

Figure 8:
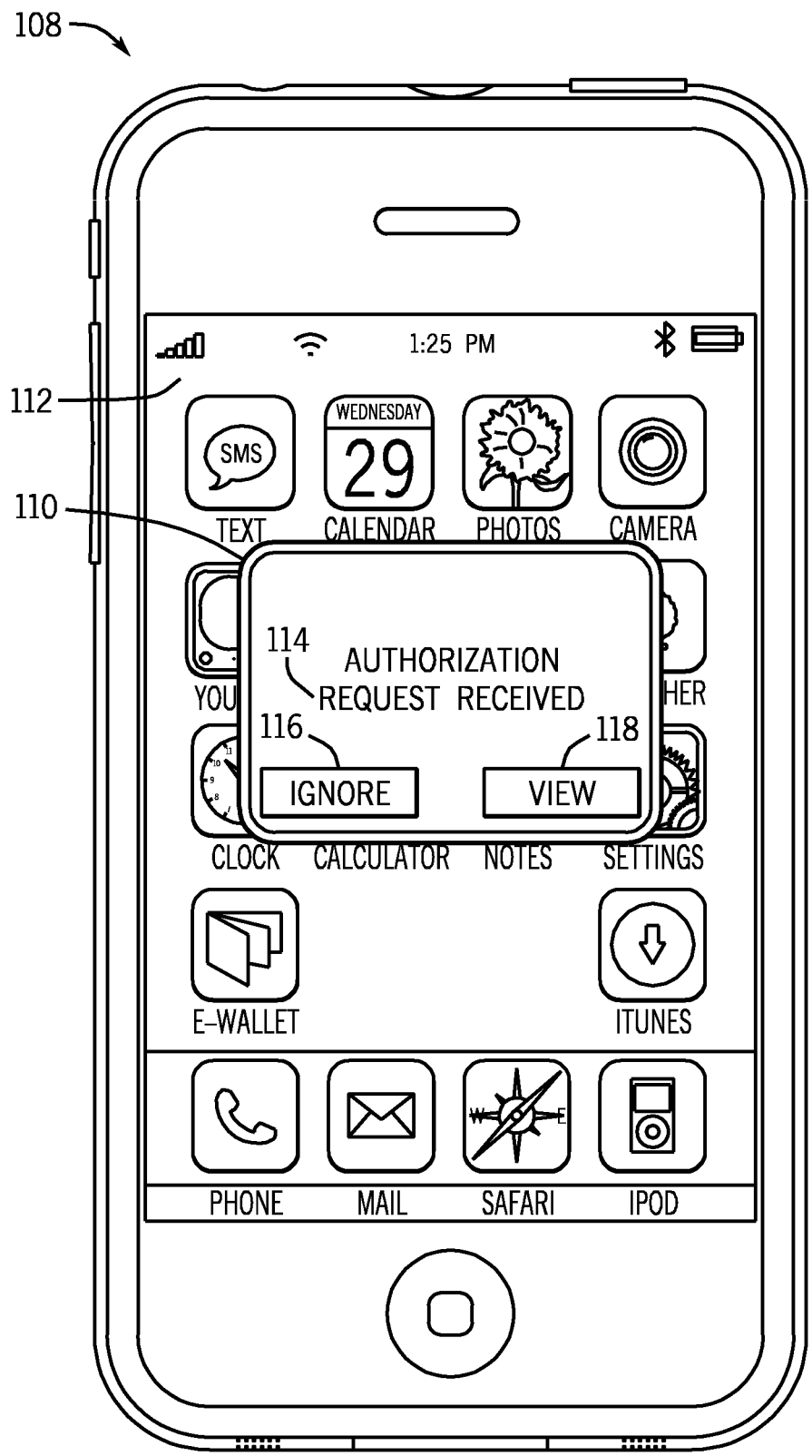
FIG. 8 is a screen of a second device indicating that an authorization request is received, in accordance with the present disclosure.

Alternatively, in addition to authorization through the first device 60, the present techniques include requesting and receiving authorization wirelessly, and from a different device (e.g., the second device 62). Referring back to FIG. 5, to initiate a secondary authorization process 66, the first device 60 may transmit (block 74) the authorization request signal 76 wirelessly in a wireless network 64. In some embodiments, the authorization request signal 76 may go through an application server 66 (FIG. 4) and undergo some processing before it reaches the second device 62. The second device 62 may receive (block 78) the authorization request signal 76 and indicate (block 79) that the authorization request 76 is received on the second device 62. FIG. 8 is an illustration of a screen 112 indicating that a secondary authorization request 76 has been received at the second device 62. In the illustrated embodiment, when a secondary authorization request 76 is received (block 78), an authorization request notification 110 may appear on a screen 112 of the second device 62. As illustrated, the authorization request notification 110 may include a message 114, an ignore button 116, and/or a view button 118. The message 114 may include content related to the authorization request signal 76, such as information regarding the particular sender, time, and other related details. Selection of the ignore button 116 may return the second device 62 to its previous content or function, and selection of the view button 118 may result in the second device 62 prompting (block 80) for authentication and/or authorization.

Figure 9:
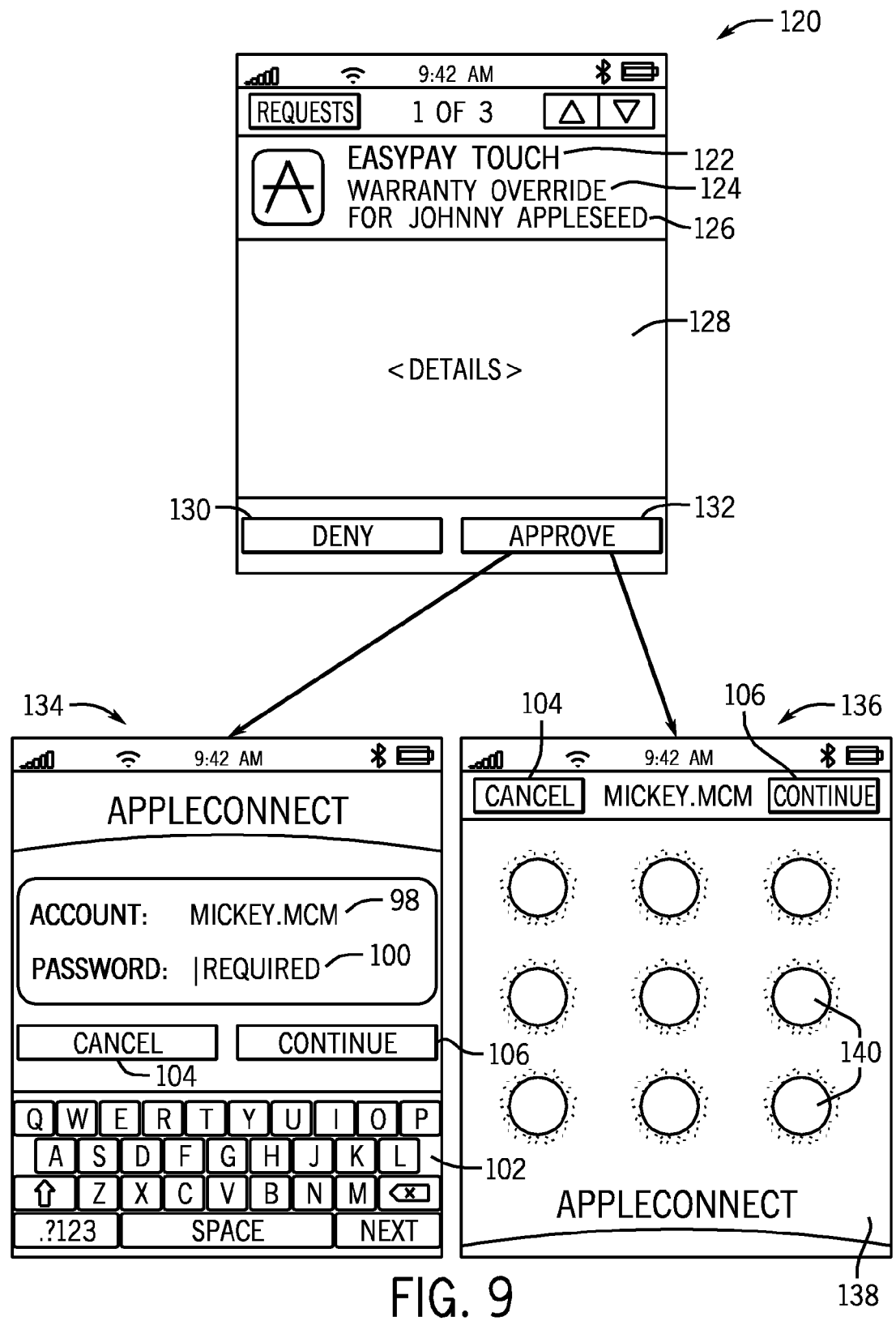
FIG. 9 is an illustration of a progression of screens on a second device during authorization of an authorization request, in accordance with the present disclosure.

FIG. 9 is an illustration of a progression of screens which may be displayed on the second device 62 involved in prompting (block 80) for authentication and/or authorization in response to an authorization request 76. As illustrated in FIG. 9, in some embodiments, the second device 62 may display an authorization request details screen 120, a password login screen 134, and a gesture login screen 136. In the present embodiment, the authorization request details screen 120 may be displayed after the authorized user activates the view button 118 corresponding to the authorization request notification 110 (FIG. 8). As illustrated in the present embodiment, the authorization request details screen 120 may include information relating to the details of the authorization request 76, such as an application name 122, an application function 124, and a requester name 126. The application name 122 may indicate the application, program, and/or network through which the authorization request 76 is received. The application function 124 may generally refer to a specific function or content that the first device 60 is requesting to access. The requester name 126 may identify the limited authorization user operating the first device 60 and/or requesting the authorization.

In the present embodiment, the authorization request details screen 120 may also includes a details window 128, which may show any additional information regarding the authorization request such as the time, location, priority level, and so forth. The details window 128 may also contain other details or instructions regarding the authorization request. For example, a user of the first device 60 may input additional details or questions along with the authorization request. The authorization request details page 120 may also include a deny button 130 and an approve button 132. A selection of the deny button 150 may deny the authorization request, and a selection of the approve button 132 may approve the authorization request. In some embodiments, once the approve button 132 is selected, the second device 62 may request authentication to verify the identity of the current user of the second device 60. Successful authentication may also result in authorization in response to the authorization request if the authenticated user indeed has authorization to grant authorization to the authorization request.

Two embodiments for authenticating a full authority user on the second device 62 are represented in FIG. 9. Similar to the input screen 94 and gesture screen 136 discussed with respect to FIGS. 7A and 7B, authentication on the second device 62 may also involve an input screen 134 and a gesture screen 136. In one embodiment, the input screen 134, includes an account data field 98 and a password data field 100. Information generally related to the identity of the user, may be entered in the account data field 98, and a password may be entered in the password data field 100. The screen 134 may also include a cancel button 104 and a continue button 106. Selection of the cancel button 104 may exit the secondary authorization process. The continue button 106 may become active after the user enters information in the account data field 98 and the password data field 100. If the continue button 106 is selected, the second device 62 may analyze the entered information to determine whether the entries made in the account data field 98 and the password data field 100 correspond to an account having authorization to authorize access to the restricted content on the first device 60. In the present embodiments, a user may use a keypad 102 to input account data and password data.

In some embodiments, a second device 62 may also authenticate a user on a gesture login page 136. The gesture login page 136 may include a gesture node arrangement 138 having multiple gesture nodes 140. Generally, a user may contact the gesture nodes in a path or pattern which may be compared to a previously stored path or pattern for authentication of a user on the second device 62. As a full authority user may have a unique path of pattern in interfacing with the gesture map, correctly touching the nodes 140 and/or gesture login 138 on gesture login page 136 may authenticate the identity of the full authority user, and thereby grant authorization to the authorization request from the second device 62. The screen 136 may also include a cancel button 104 and a continue button 106, where selecting the cancel button 104 may exit the secondary authorization process on the second device 62, and selecting the continue button 106 may prompt the second device 62 to verify the entered gesture.

In some embodiments, in order to obtain authentication, the second device 62 may transmit the authentication input data, such as the password input or gesture input data to the authentication server 65, where it is generally authenticated by comparing the authentication input to a database of stored authentication keys. The authentication server 65 may match the authentication input with stored authentication keys in an account database in the authentication server 65 to authenticate the second device 64.

In some embodiments, the second device 62 may not prompt (block 80) for authentication before transmitting authorization to the first device 60. For example, in some embodiments, the second device 62 may transmit (block 82) an authorization signal 83 in response to simply selecting an approve button (e.g., the approve button 132). In some embodiments, the second device 62 may require authentication of the full authority user when initially activating the second device 62 before the second device 62 can authorize secondary authorization requests. As such, the full authority user may not need to be authenticated to authorize each secondary authorization request.

Once approval is selected on the second device 62 and/or once the second device 62 authenticates a full authority user, the second device 62 may transmit (block 82) an authorization signal 83 to the first device 60 via the wireless connection 64. The first 60 device may then receive (block 84) the authorization signal 83. In response to receiving (block 84) the authorization signal 83, the first device 60 may access (block 84) the restricted content.

In some embodiments, the authorization signal 83 may be transmitted by the second device 62 to the first device 60 through the application server 66. For example, after authentication on the authentication server 65, the application server 66 may transmit the authorization signal 83 to the first device 60. In some embodiments, the application server 66 may receive the authentication input data from the second device 62 and relay the data to the authentication server 65 for authentication. Other non-authorization related communication between the first device 60 and the second device 62 may also be supported by the application server 66. Furthermore, the application server 66 may also continue to monitor and/or record use of the restricted content on the first device 60 after the first device 60 accesses the restricted content. It should be noted that while the present disclosure refers to transmissions of the authorization request, authentication input, and the authorization signal between the first device 60 and the second device 64, any or all of these transmissions may pass through the authentication server 65 and/or the application server 66 in the wireless network 64.

In one or more embodiments, when a first device 60 receives authorization and is able to access the restricted content, the first device 60 may have access to the restricted content for a limited amount of time, and/or for the duration of a function. Furthermore, the first device 60 may have access only to the specific content or function for which it has requested and received authorization.

Figure 10:
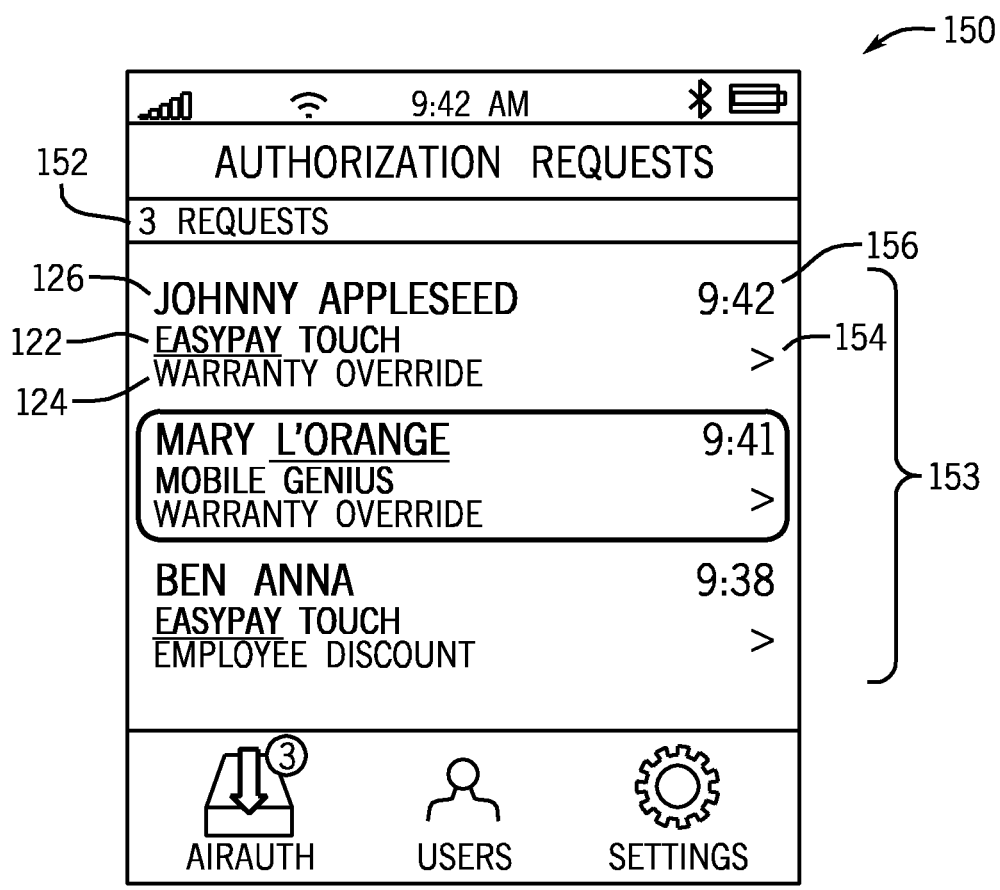
FIG. 10 is a screen of a second device having a queue of authorization requests, in accordance with the present disclosure.

In some embodiments, the second device 62 may receive secondary authorization requests from more than one device. FIG. 10 is an illustration of an authorization request queue screen 150 which may be displayed by the second device 62 in some embodiments. The authorization request queue screen 150 may indicate a number 152 of total requests, and include a queue 153 of one or more authorization requests 154. In the present embodiment, each authorization request 154 may further include details corresponding to each request in the queue 153, such as a requester name 126, an application name 122, an application function 124, and a time of request 156. As illustrated in FIG. 10, authorization requests may be received from different requesters, who may be limited authority users each using different devices. In some embodiments, the full authority user using the second device 62 may select an authorization request from the queue 153 to view and approve or deny. In some embodiments, an authorization request may be selected from the queue 153 regardless of order in which it appears in the queue 153.

In one or more embodiments, a requesting device may send additional authorization requests to more than one authorizing device. For example, when making an authorization request, the first device 60 may be able to determine, via the wireless network, which authorizing devices are active (e.g., in operation and/or accepting secondary authorization requests). The requesting device may be configured to send an authorization request to all active authorizing devices. The requesting device may also be configured to automatically send the authorization request to a specific authorizing device, chosen based on various detectable parameters, such being closest in distance, having the shortest authorization request queue, and so forth. The requesting device may also be configured to allow the user of the requesting device to select the authorizing device(s) to send the secondary authorization request. For example, a requesting device may display the identity of specific authorized users operating the authorizing devices and allow the selection of a particular authorized user and/or authorizing device for sending the secondary authorization request signal.

In one or more embodiments, the requesting device may also be configured to send a message to an authorizing device or advising the authorized user to go to the location of the requesting device and limited authority user. The authorizing device may be configured to indicate the physical location of the requesting device to the full authority user so that the full authority user may be able to find the limited authority user (e.g., in the location of a retail store). For instance, if the limited authority user has a more complex problem that cannot be effectively solved by simply sending a secondary authorization request, more in-depth assistance may be requested using the secondary authorization techniques.

Furthermore, one or more embodiments may include an automatic approval for certain authorization requests, where an approving device may automatically approve requests without additional action from the full authority user. For example, the second device may automatically approve certain secondary authorization requests or requests received by certain requesting devices. Accordingly, such decisions regarding automated approving of authorization requests may also be stored and/or processed on the application server 66.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A system, comprising:
 a first device configured to request authorization by transmitting a request signal before performing a restricted activity, receive an authorizing signal, and perform the restricted activity in response to receiving the authorizing signal; and
 a second device configured to:
  receive the request signal from the first device,
  receive an authentication input for authenticating a user of the second device, wherein the user has privileges to authorize the restricted activity on the first device,
  receive an authorization input from the user of the second device for authorizing the restricted activity on the first device, and
  transmit the authorizing signal after the user of the second device is authenticated and after the first device is authorized by the user of the second device.

2. The system of claim 1, comprising an authentication server, wherein the authentication input is transmitted from the second device to the authentication server for authentication.

3. The system of claim 1, comprising an application server configured to wirelessly transmit the authorizing signal from the second device to the first device.

4. The system of claim 1, wherein the first device is further configured to receive the authorization input, from the authorized user, for enabling the restricted activity on the first device.

5. The system of claim 4, wherein the authorization input comprises a text input, a gesture input, or an option between the text input and the gesture input.

6. The system of claim 1, wherein the first and second devices are one of a portable electronic device or a stationary electronic device.

7. The system of claim 1, wherein the first device is configured to transmit the request signal to a plurality of second devices.

8. The system of claim 1, wherein the second device is configured to receive request signals from, and send authorizing signals to, a plurality of first devices.

9. The system of claim 1, wherein the second device is configured to queue received authorization requests from one or more first devices.

10. The system of claim 9, wherein the second device is configured to receive the authorization input for at least one of the queued authorization requests.

11. The system of claim 1, wherein the first device is configured to select one of a plurality of second devices for transmitting the authorization request signal.

12. The system of claim 1, wherein the authentication input on the second device comprises a text input, a gesture input, or an option between the text input and the gesture input.

13. The system of claim 1, wherein the second device is configured to receive the authentication input to authenticate the authorized user for a session, and the second device is configured to transmit the authorizing signal to the first device when the first device is authorized without additionally authenticating the authorized user on the second device during the session.

14. The system of claim 1, wherein the second device is configured to authenticate the authorized user on the second device in response to each received authorization request signal, before transmitting each respective authorization signal.

15. The system of claim 1, wherein at least one of the first device and the second device is a touch screen device.

16. A method of obtaining wireless authorization on a first device from a second device, comprising:
 transmitting an authorization request signal from the first device to the second device, the authorization request signal requesting authorization to perform a restricted activity in the first device, wherein in response to receiving the authorization request signal, the second device receives an authorization input from a user of the second device, wherein the authorization input, comprises one of a first input to authorize the first device to perform the restricted activity or a second input to decline authorization of performing the restricted activity on the first device;
 receiving an authorization signal at the first device, if the first input is selected at the second device; and
 responsive of receiving the authorization signal, enabling performance of the restricted activity on the first device.

17. The method of claim 16, wherein in response to selecting the first input on the second device, prompting for an authentication input on the second device, wherein the authorization signal is transmitted to the first device only if the second device is successfully authenticated using the authentication input.

18. The method of claim 16, wherein the authorization input on the second device comprises displaying a third input, wherein selection of the third input results in the second device queuing the authorization request signal.

19. The method of claim 16, wherein the second device is configured to display a queue comprising a list of a plurality of received authorization request signals.

20. The method of claim 17, wherein the second device transmits the authentication input to an authentication server configured to authenticate the authentication input.

21. The method of claim 16, wherein receiving the authorization signal at the first device comprises receiving, wirelessly, the authorization signal from the second device through an application server.

22. A retail transaction system, comprising:
 a first device comprising unrestricted content and restricted content, wherein the first device is configured to:
  request authorization transmitting an authorization signal, in response to an attempt to access the restricted content, and receive an authorizing signal granting access to restricted content on the first device;

a second device configured to receive the authorization request signal transmitted by the first device, and transmit authorizing signal responsive to the authorization request signal; and a network through which the first device and the second device communicates, wherein the second device transmits the authorizing signal over the network.

23. The retail transaction system of claim 22, wherein the second device is configured to request authentication from an authorized user of the second device before the authorizing signal is received by the first device.

24. The retail transaction system of claim 23, wherein the second device is configured to receive an authentication input in response to requesting authentication, wherein the authentication input is authenticated by an authentication server connected to the network.

25. The retail transaction system of claim 22, wherein the second device is configured to request either a text-based authentication or a gesture-based authentication from an authorized user before transmitting the authorizing signal.

26. The retail transaction system of claim 22, wherein the first device or second device is one of a portable device or a stationary device.

27. The retail transaction system of claim 22, wherein the authorizing signal grants the first device access to the restricted content for a limited time.

28. A non-transitory computer readable medium comprising instructions, which when executed by a processing system, executes a method of obtaining wireless authorization on a first device from a second device, the method comprising:

transmitting an authorization request signal from the first device to the second device, the authorization request signal requesting authorization to perform a restricted activity in the first device, wherein in response to receiving the authorization request signal, the second device receives an authorization input from a user of the second device, wherein the authorization comprises one of a first input to authorize the first device to perform the restricted activity or a second input to decline authorization of performing the restricted activity on the first device;

receiving an authorization signal at the first device, if the first input is selected at the second device; and responsive of receiving the authorization signal, enabling performance of the restricted activity on the first device.

29. The non-transitory computer readable medium of claim 28, wherein in response to selecting the first input on the second device, prompting for an authentication input on the second device, wherein the authorization signal is transmitted to the first device only if the second device is successfully authenticated using the authentication input.

30. The non-transitory computer readable medium of claim 28, wherein the authorization input on the second device comprises displaying a third input, wherein selection of the third input results in the second device queuing the authorization request signal.

31. The non-transitory computer readable medium of claim 28, wherein the second device is configured to display a queue comprising a list of a plurality of received authorization request signals.

32. The non-transitory computer readable medium of claim 29, wherein the second device transmits the authentication input to an authentication server configured to authenticate the authentication input.

33. The non-transitory computer readable medium of claim 28, wherein receiving the authorization signal at the first device comprises receiving, wirelessly, the authorization signal from the second device through an application server.

34. The non-transitory computer readable medium of claim 28, wherein the restricted activity on the first device is not permitted by the first device prior to receiving the authorization signal and is permitted after receiving the authorization signal and wherein the restricted activity, when permitted, involves access by the first device to certain functions or content.

35. The method of claim 1 wherein the restricted activity on the first device is not permitted by the first device prior to receiving the authorizing signal and is permitted after receiving the authorizing signal and wherein the restricted activity, when permitted, involves access by the first device to certain functions or content.

* * * * *